US012748379B2

(12) United States Patent
Christan et al.

(10) Patent No.: US 12,748,379 B2
(45) Date of Patent: Sep. 29, 2026

(54) PART FOR ATTACHING AN OUTER LAST COIL OF A BALANCE SPRING OF A HOROLOGICAL MOVEMENT

(71) Applicant: ETA SA Manufacture Horlogère Suisse, Grenchen (CH)

(72) Inventors: Julien Christan, Bienne (CH); Raphaël Courvoisier, Corcelles (CH)

(73) Assignee: ETA SA Manufacture Horlogère Suisse, Grenchen (CH)

( * ) Notice: Subject to any disclaimer, the term of this patent is extended or adjusted under 35 U.S.C. 154(b) by 279 days.

(21) Appl. No.: 18/509,418

(22) Filed: Nov. 15, 2023

(65) Prior Publication Data

US 2024/0210879 A1 Jun. 27, 2024

(30) Foreign Application Priority Data

Dec. 27, 2022 (EP) .................................... 22216824

(51) Int. Cl.
*G04B 17/32* (2006.01)
*G04B 17/06* (2006.01)

(52) U.S. Cl.
CPC ......... *G04B 17/325* (2013.01); *G04B 17/063* (2013.01)

(58) Field of Classification Search
CPC ...... G04B 17/32; G04B 17/34; G04B 17/063; G04B 17/325; G04B 17/06
See application file for complete search history.

(56) References Cited

U.S. PATENT DOCUMENTS 3,241,307 A * 3/1966 Dickerman .......... G04B 18/023 368/176
3,262,261 A * 7/1966 Monnin ............... G04B 17/325 368/178
3,943,701 A 3/1976 Poix
7,293,913 B2 * 11/2007 Peters .................. G04B 17/066 368/178

(Continued)

FOREIGN PATENT DOCUMENTS

DE 19 05 488 U 11/1964
EP 1 780 611 A2 5/2007
JP 53-122960 U 9/1978

OTHER PUBLICATIONS

Berners Dictionary (Year: 2025).*

(Continued)

*Primary Examiner* — Sean Kayes
(74) *Attorney, Agent, or Firm* — Oblon, McClelland, Maier & Neustadt, L.L.P.

(57) ABSTRACT

An attachment part for attaching a free end of an outer last coil of a balance spring of a horological movement, this balance spring taking the form of a ribbon wound in coils and being delimited by first and second faces which extend parallel to and at a distance from one another, the attachment part including elastically deformable clamping means which are arranged to be brought into contact with the free end of the outer last coil of the balance spring in order to exert a resilient clamping force on this free end so as to guarantee the immobilisation thereof, this resilient clamping force being exerted along at least a first line of contact (A; B) on the first face of the balance spring and along a contact surface (S) on the second face.

11 Claims, 2 Drawing Sheets

(56) References Cited

U.S. PATENT DOCUMENTS

| | | | | |
|---|---|---|---|---|
| 7,824,097 | B2 * | 11/2010 | Lippuner | G04B 15/14 368/175 |
| 10,018,965 | B2 * | 7/2018 | Christan | G04B 17/325 |
| 10,180,659 | B2 * | 1/2019 | Wiederrecht | G04B 17/325 |
| 2016/0147196 | A1 * | 5/2016 | Villard | G04B 15/06 368/127 |
| 2022/0171335 | A1 * | 6/2022 | Le Moal | G04B 17/066 |

OTHER PUBLICATIONS

Japanese Office Action issued on Dec. 10, 2024 in Japanese Patent Application No. 2023-199225, citing document 1 therein, 6 pages.

European Search Report issued Jun. 7, 2023 in European Application 22216824.7 filed on Dec. 27, 2022 citing documents 15-17 therein, 3 pages (with English Translation of Categories of Cited Documents).

* cited by examiner

PART FOR ATTACHING AN OUTER LAST COIL OF A BALANCE SPRING OF A HOROLOGICAL MOVEMENT

CROSS-REFERENCE TO RELATED APPLICATION

This application claims priority to European Patent Application No. 22216824.7 filed on Dec. 27, 2022, the entire disclosure of which is hereby incorporated herein by reference.

TECHNICAL FIELD OF THE INVENTION

The present invention relates to a part for attaching an outer last coil of a balance spring of a sprung balance assembly of a horological movement.

TECHNOLOGICAL BACKGROUND

In the horological field, a balance spring, associated with a balance, forms a regulating member commonly referred to as a sprung balance for mechanical timepieces. The balance spring is initially viewed as a very thin spring that is wound about itself in concentric coils when no stress is exerted thereon. In the mounted state, a first end of the balance spring, referred to as the inner first coil, is attached to a collet fitted on a staff of the balance, and a second end of the balance spring, referred to as the outer last coil, is attached to a stud which is a part typically attached by means of a stud holder in a bar for the balance, also referred to as a balance cock.

More specifically, the time base for mechanical timepieces, also referred to as the oscillating system, comprises a spring-balance pair and an escapement. The balance consists of a balance staff pivoted between a first and a second bearing and connected to a balance rim by means of radial arms. The balance spring is attached, by its inner first coil, to the staff of the balance, for example by means of a collet, and is attached, by its outer last coil, to a fixed attachment point such as a stud carried by a stud holder.

The escapement, in a very widespread embodiment thereof, comprises a double roller system consisting of a table-roller carrying an impulse pin and a safety-roller in which a notch is made. The escapement further comprises a pallet-lever with a pallet-staff pivoted between a first and a second bearing. The pallet-lever consists of a lever that connects a fork to an entry arm and to an exit arm. The fork consists of an entry horn and of an exit horn, and carries a dart. The travel of the fork is limited by an entry banking pin and an exit banking pin, which can be made in one piece with a pallet-bridge. The entry arm and the exit arm carry an entry pallet and an exit pallet respectively. Finally, the pallet-lever cooperates with an escape wheel set comprising an escape wheel and an escape pinion, this assembly formed by the escape wheel and pinion being pivoted between a first and a second bearing.

A balance spring is a spring which adopts the shape of a spiral when at rest. Wound in a horizontal plane, parallel to the plane of the horological movement, the balance spring serves only one purpose: to make the balance oscillate about its position of equilibrium, also referred to as the dead centre, at as constant a frequency as possible. When the balance leaves its position of equilibrium by pivoting in a given direction, the balance spring contracts. This creates a restoring torque in the balance spring that causes the balance to return to its position of equilibrium. During this beat, the balance spring expands. However, as the balance has acquired a certain speed, and thus kinetic energy, it exceeds its position of equilibrium in the opposite direction to the previous until the restoring torque exerted by the balance spring on the balance stops it again and forces it to turn in the other direction.

The balance spring thus alternately expands and contracts: it is said to breathe. However, many factors can play a part in preventing a balance spring from developing isochronously during the expansion and contraction phases. In particular, the balance spring must withstand oxidation and magnetism, which cause the coils to stick together and work to disrupt the precision of the watch, or even stop it entirely. The influence of atmospheric pressure, on the other hand, is low. For a long time, temperature has been the main problem, because heat expands the metal, while cold shrinks it. The balance spring must thus be resilient so that it can deform and yet always return to its original shape.

The material used to produce balance springs is usually steel. Being ductile, the steel used must resist corrosion. Developments over the past two decades have also proposed producing balance springs from silicon. Silicon balance springs allow a greater precision of the rate than their steel predecessors, in particular because they are insensitive to magnetism. However, they have a higher cost price and, because they are fragile, they are more difficult to assemble.

A balance spring must be isochronous. Regardless of how far the balance turns, it must always take the same amount of time to oscillate. If the balance spring contracts by just a few degrees, it accumulates little energy and returns slowly to its position of equilibrium. If the balance spring has moved far from its position of equilibrium, it very quickly moves in the opposite direction. The important thing is that these two journeys take the same amount of time to complete. The underlying idea is that the energy available to the balance spring is not constant and that it must still function, whether the watch is fully wound or in the final hours of its power reserve.

Due to the small dimensions thereof, balance springs are difficult to assemble. However, the way in which the two ends of a balance spring are attached also has a major influence on the precision of the rate of the horological movement. In most mechanical horological movements, the two ends of the balance spring are inserted into a drilled part and rendered immobile by means of a pin which is forcibly assembled manually using pliers. This can cause the balance spring to rotate slightly, which is detrimental to the precision of the rate of the movement.

Another technique consists of attaching the ends of the balance springs using an adhesive. However, this technique also has its limitations. It has been observed that, due to its viscosity, the adhesive exerts a tensile force on the balance spring by capillary action and can press the ends of the balance spring against the walls of the stud in which these ends are engaged. The resulting deformation of the balance spring induces mechanical stresses therein, which mechanical stresses are detrimental to keeping a consistent rate.

To overcome these problems, the Applicant has already proposed a method for attaching a balance spring consisting of adhesively bonding the outer last coil of a balance spring in a stud by means of a drop of fluid adhesive which can be polymerised, for example, by means of ultraviolet radiation. Thus, even if, when the drop of adhesive is deposited, for example by means of a syringe-type adhesive dispenser, the free end of the last coil of the balance spring moves slightly under the effect of the weight of the drop of adhesive, which induces undesired mechanical stresses in the balance spring, the adhesive is sufficiently fluid before hardening to allow the free end of the last coil of the balance spring to return spontaneously to its rest position. The mechanical stresses induced in the balance spring when the drop of liquid adhesive is deposited thus disappear on their own, and the consistency of the rate of the balance spring is not affected by the adhesive bonding operation carried out thereon.

The above solution thus allows a balance spring to be attached, by the free end of its outer last coil, within a stud while eliminating all, or at least most, of the mechanical stresses usually induced in such a balance spring during the assembly thereof. This greatly improves the consistency of the rate of the balance spring. During use, however, the Applicant has nonetheless realised that the hardened adhesive pad formed when the drop of liquid adhesive used to attach the free end of the outer last coil of the balance spring is polymerised sometimes tends to detach from the stud, which, of course, causes the horological movement in which this balance spring is installed to immediately fail. Such a situation is due in particular to problems with the surface condition of the stud, which prevent the adhesive pad from adhering perfectly to the stud, and due to the ageing of the adhesive pad over time. Moreover, when the ambient temperature rises, most adhesives soften, which consequently modifies the active length, and thus the stiffness, of the balance spring, and thus has a negative impact on the rate of the horological movement.

Finally, it should be noted that, in particular in the case of top-of-the-range horological movements, the use of adhesives or synthetic products is avoided wherever possible.

SUMMARY OF THE INVENTION

The purpose of the present invention is to overcome the aforementioned drawbacks as well as others by providing a part, one advantage whereof lies in the fact that it allows the outer last coil of a balance spring to be attached without the use of adhesive.

To this end, the present invention relates to a part arranged to attach a balance spring of a horological movement, this balance spring, wound in coils, being delimited by first and second faces which extend at a distance from one another, this attachment part comprising elastically deformable clamping means which are arranged to be brought into contact with the balance spring in order to exert a resilient clamping force on this balance spring so as to guarantee the immobilisation thereof, this resilient clamping force being exerted along at least a first line of contact on the first face of the balance spring and along a contact surface on the second face.

According to one specific embodiment of the invention, the resilient clamping force is exerted on the first face of the balance spring along the first and second lines of contact.

According to another specific embodiment of the invention, the clamping means take the form of separate first and second clamping means which face one another.

According to yet another embodiment of the invention, the first and second clamping means take the form of two elastically deformable arms, the free ends whereof facing one another being arranged to be brought into contact with the free end of the outer last coil of the balance spring in order to exert a resilient clamping force on this free end in a direction perpendicular to a plane in which the balance spring extends.

According to yet another embodiment of the invention, the attachment part takes the form of a tuning fork closing in on itself at the free ends facing the two arms.

According to yet another embodiment of the invention, the attachment part is provided with gripping means which are arranged to allow the means for clamping the free end of the outer last coil of the balance spring to be moved apart in order to release this free end.

According to yet another embodiment of the invention, the attachment part comprises means for being mounted on a balance cock or around a pivot bearing of the balance.

According to yet another embodiment of the invention, the assembly between the part and the free end of the outer last coil of the balance spring is removable.

According to yet another embodiment of the invention, the attachment part is obtained by stamping and bending.

According to yet another embodiment of the invention, the attachment part is made of a harder material than the material from which the balance spring is made.

According to yet another embodiment of the invention, the balance spring takes the form of a ribbon, the first and second faces whereof extend parallel to one another.

According to yet another embodiment of the invention, the balance spring is provided with a plate on which the clamping means exert the resilient clamping force to ensure the immobilisation thereof.

Thanks to these features, the present invention provides a part which advantageously allows a free end of an outer last coil of a balance spring to be attached without the use of adhesive. This thus avoids all the problems associated with the use of an adhesive for such an assembly and guarantees, where relevant, the removable nature of such an attachment part-balance spring assembly. Moreover, the attachment part can be obtained very simply, in particular by stamping and bending, and is thus inexpensive to produce. The cost price of a sprung balance assembly fitted with an attachment part according to the invention is further reduced in the case where the attachment part is provided with a means for attaching it to a cock, such as a balance cock for a sprung balance assembly, or around a pivot bearing of the balance; this is because, in this case, the attachment part according to the invention simultaneously acts as a stud and a stud holder.

BRIEF DESCRIPTION OF THE FIGURES

Other features and advantages of the present invention will more clearly emerge upon reading the following detailed description of one embodiment of a part for attaching a balance spring according to the invention, this example being provided for the purposes of illustration only and not intended to limit the scope of the invention, given with reference to the accompanying drawing, in which.

DETAILED DESCRIPTION OF THE INVENTION

Figure 1A:
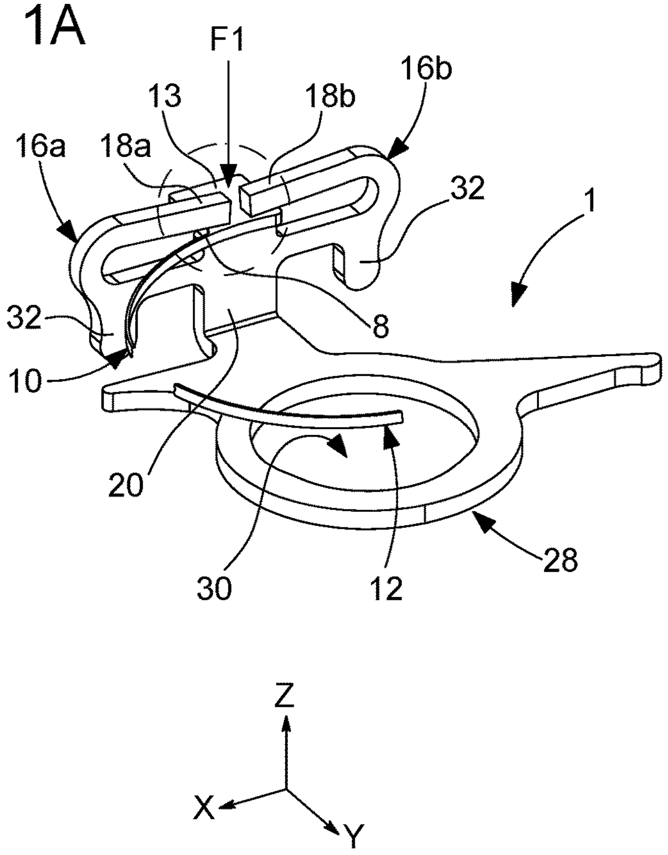
FIG. 1A is a perspective top view of an attachment part according to the invention, this attachment part, arranged like a tuning fork, allowing a free end of an outer last coil of a balance spring to be immobilised by clamping.
Figure 1B:
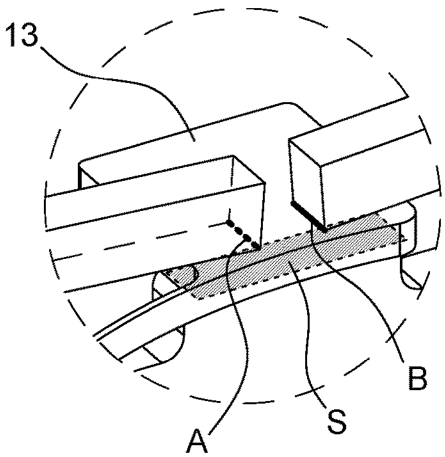
FIG. 1B is a more large-scale view of the encircled area in FIG. 1A.
Figure 2:
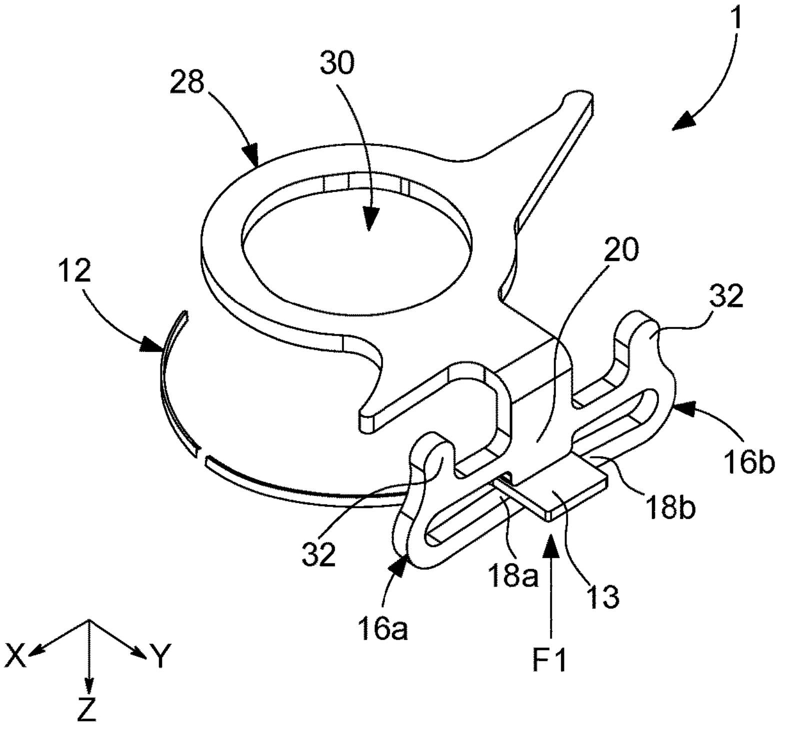
FIG. 2 is a perspective bottom view of the tuning fork in FIG. 1A.
Figure 3:
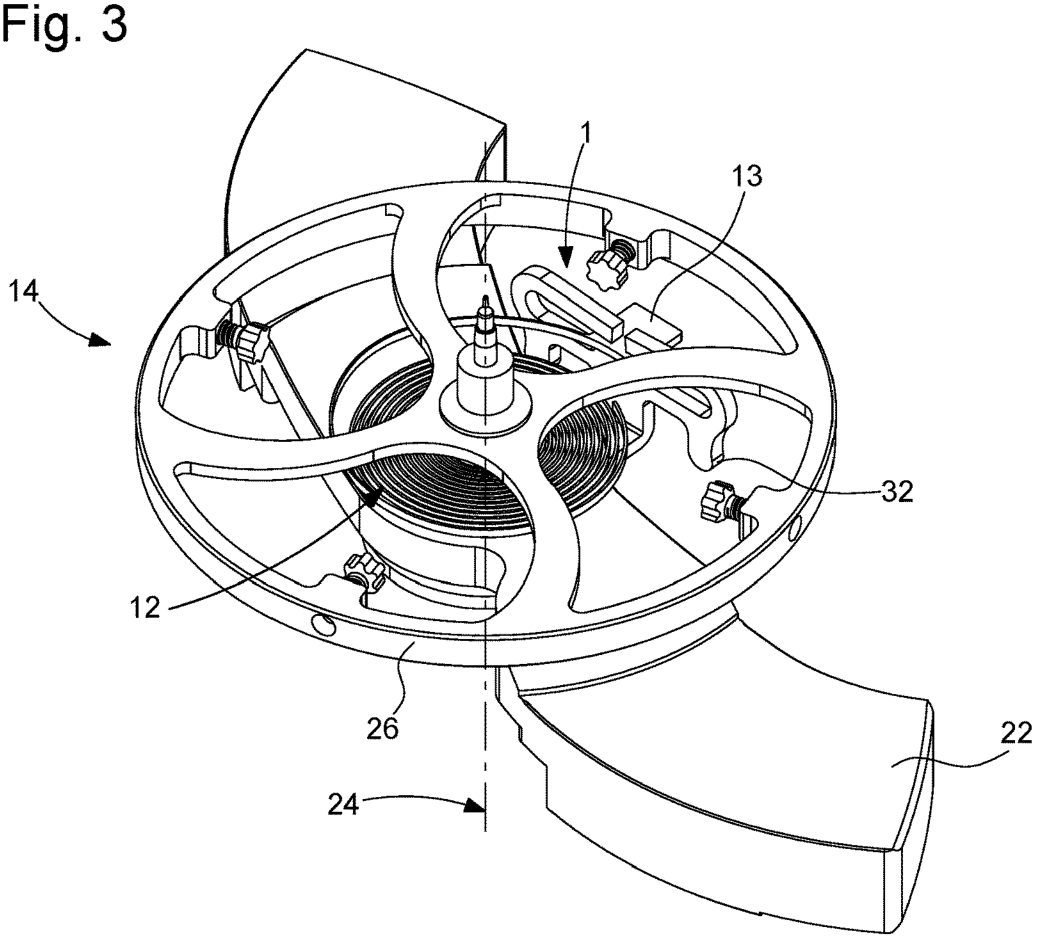
FIG. 3 is a perspective top view of a sprung balance assembly fitted with the attachment part according to the invention.
Figure 4:
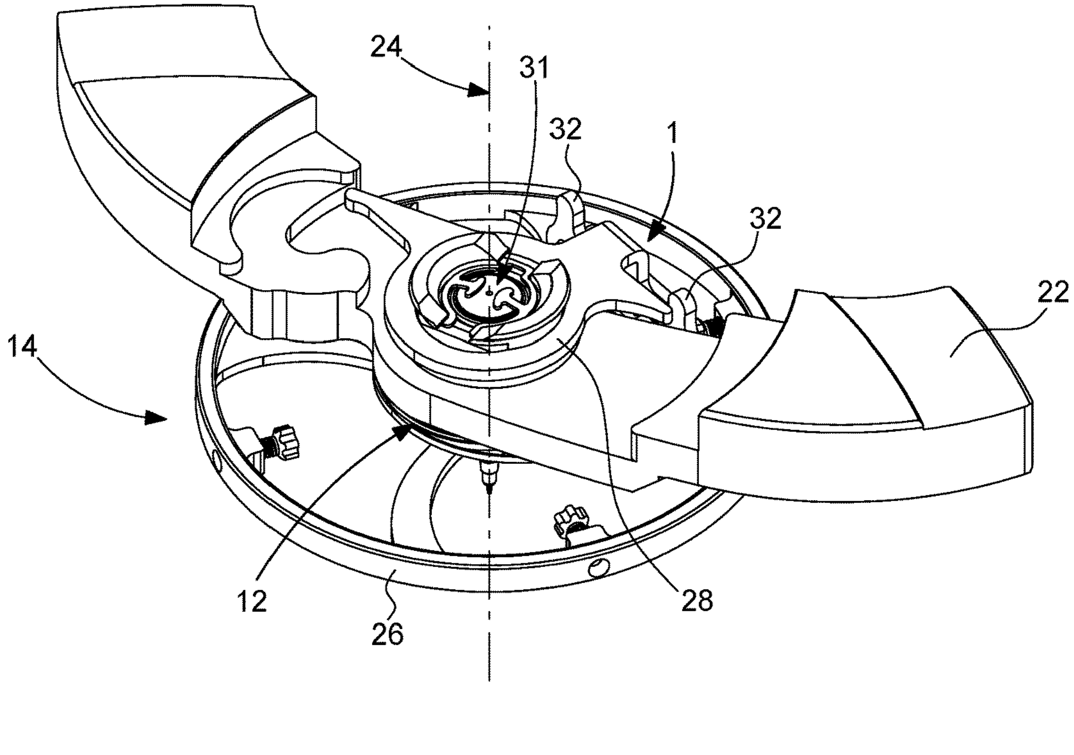
FIG. 4 is a perspective bottom view of the sprung balance assembly according to the invention.

The present invention was drawn from the general inventive idea consisting of providing a part which allows a free end of an outer last coil of a balance spring to be attached without the use of adhesive. More specifically, in accordance with the invention, the attachment part is conventionally provided with a first and a second arm which, depending on the chosen embodiment, exert a resilient clamping force on the free end of the outer last coil of the balance spring in a direction perpendicular to the plane in which this last coil extends. For example, when produced by stamping and bending, the attachment part is such that the arms can be bent over the free end of the outer last coil of the balance spring, so as to exert a sufficient resilient clamping force on this free end to guarantee the immobilisation thereof. Moreover, given that the blocking of the outer last coil of the balance spring is obtained by bending the arms, it is easy to understand that, where necessary, the assembly formed by the attachment part and the balance spring can be disassembled simply by unbending the arms. Moreover, the attachment part is inexpensive to produce, as it can be obtained by stamping and bending. The cost price is further reduced in the case where the attachment part is provided with means for attaching it to a cock such as a balance cock of the horological movement; in the latter case, the invention provides a part which acts both as a stud and as a stud-holder.

Denoted as a whole by the general reference numeral 1, the part according to the invention is intended to allow for the attachment of a free end 8 of an outer last coil 10 of a balance spring 12 for a horological movement. In the example shown in the drawing, the balance spring 12 is provided with a plate 13 attached by any suitable means such as welding or made in one piece with the free end 8 of the outer last coil 10. To this end, according to the invention, the attachment part 1 comprises elastically deformable clamping means which are arranged to be brought into contact with and to clamp a plate 13 provided at the free end 8 of the outer last coil 10 of the balance spring 12 in order to exert a resilient clamping force F1 on this plate 13 in a direction Z perpendicular to a plane X, Y in which the balance spring 12 extends.

By ensuring the immobilisation, by clamping, of the plate 13 provided at the free end 8 of the outer last coil 10 of the balance spring 12 in the direction Z only, any detrimental effect that the attachment of the balance spring 12 by means of the attachment part 1 according to the invention could have on the precision of the rate of a sprung balance assembly 14 fitted with such an attachment part 1 is limited as much as possible. More specifically, it is known that exerting a mechanical stress on the free end 8 of the outer last coil 10 of a balance spring 12 in a direction Z perpendicular to the plane X, Y in which the balance spring 12 extends is considerably (by a factor of the order of 10) less detrimental to the precision of the rate of a sprung balance assembly 14 than when the balance spring 12 is stressed in the plane X, Y in which it extends.

According to the invention, the attachment part 1 comprises separate first and second clamping means which immobilise the plate 13 with which the free end 8 of the outer last coil 10 of the balance spring 12 is provided, which in particular prevents any risk of this plate 13 slipping and pivoting about itself, which would of course be detrimental to the correct operation of the sprung balance assembly 14 and would require the timepiece fitted with such a sprung balance assembly 14 to be returned to the factory.

According to a preferred but non-limiting embodiment, the first and second clamping means take the form of two elastically deformable arms 16_a_, 16_b_, the respective free ends 18_a_, 18_b_ whereof facing one another are arranged so as to be brought into contact with and clamp the plate 13 provided at the free end 8 of the outer last coil 10 of the balance spring 12 along two separate lines of contact A, B. Preferably but not exclusively, the attachment part 1 takes the form of a tuning fork-shaped clamp which closes in on itself at the free ends 18_a_, 18_b_ facing the two arms 16_a_, 16_b_, the plate 13 present at the free end 8 of the outer last coil 10 of the balance spring 12 being clamped between the free ends 18_a_, 18_b_ of these two arms 16_a_, 16_b_ and a crosspiece 20 which connects these two arms 16_a_, 16_b_ together. According to the invention, this crosspiece 20 resiliently clamps the plate 13 along a contact surface S.

It can thus be seen that bringing the two arms 16_a_, 16_b_ into contact with the plate 13 by elastic deformation allows this plate 13 to be pressed against the crosspiece 20 of the attachment part 1 and allows the plate 13 to be immobilised via a resilient clamping force which, on one side of the ribbon forming the balance spring 12, is exerted along two lines of contact A, B and which, on the other side of this ribbon forming the balance spring 12, is exerted along the contact surface S.

The attachment part 1 can be produced by any appropriate means, for example by stamping and bending, so that the cost price thereof is very low. It can be attached to a cock 22 of the horological movement. For this purpose, according to a preferred embodiment of the invention, the attachment part 1 comprises means for being mounted around a pivot axis 24 of a balance 26 of the horological movement. To this end, the attachment part 1 is extended by a mounting element 28 provided with an opening 30 whose inside diameter is adjusted to an outside diameter of a shoulder of the balance cock 22 or of a pivot bearing 31 which can be of a type known to a person skilled in the art. The attachment part 1 according to the invention thus advantageously acts as both a stud and a stud-holder.

According to a special embodiment of the invention, the attachment part 1 is provided with gripping means, for example of the horn type 32, which are arranged so as to allow, when they are clamped using tweezers, the free ends 18_a_, 18_b_ facing the two arms 16_a_, 16_b_ of the free end 8 of the outer last coil 10 of the balance spring 12 to be moved apart in order to release this free end 8. Thus, where necessary, given the absence of adhesive and the elastically deformable nature of the attachment clamp 1, the assembly formed by the attachment part 1 and the balance spring 12 can be disassembled.

It goes without saying that the present invention is not limited to the embodiment described hereinabove and that various simple alternatives and modifications can be considered by a person skilled in the art without leaving the scope of the invention as defined by the accompanying claims. In particular, it should be understood that the presence of the plate 13 is not essential for the immobilisation of the balance spring 12 by resilient clamping. More specifically, the balance spring 12 can be immobilised by means of the attachment part 1 according to the invention by directly engaging the free end 8 of the outer last coil 10 of the balance spring 12 in the space delimited by the arms 16_a_, 16_b_ and the crosspiece 20 of this attachment part 1. Similarly, it should be noted that, preferably but in a non-limiting manner, the attachment part 1 is made of a harder material than the material from which the balance spring 12 is made. Thanks to this feature, when the plate 13 or directly the free end 8 of the outer last coil 10 of the balance spring 12 is clamped, neither the arms 16_a_, 16_b_ nor the crosspiece 20 of the attachment part 1 are marked by the balance spring 1. Thus, where necessary, during the life of the timepiece fitted with the attachment part 1 according to the invention, in order to remove the balance spring 12 by unbending the arms 16*a*, 16*b* of the attachment part 1, the arms 16*a*, 16*b*, after the operation, will be able to be bent again over the free end 8 of the outer last coil 10 of the balance spring 12 without the repositioning of this free end 8 being hindered by the presence of any grooves which may have been marked into the arms 16*a*, 16*b* or the crosspiece 20.

NOMENCLATURE

1. Attachment part
F1. Resilient clamping force
Z. Direction
X, Y. Plane
8. Free end
10. Outer last coil
12. Balance spring
13. Plate
14. Sprung balance assembly
16*a*, 16*b*. Arms
18*a*, 18*b*. Free ends
A, B. Points of contact
20. Crosspiece
22. Cock
24. Pivot axis
26. Balance
28. Mounting element
30. Opening
31. Pivot bearing
32. Horns
S. Contact surface

The invention claimed is:

1. A part arranged to attach a balance spring of a horological movement, said balance spring, wound in coils in a plane, being delimited by first and second faces which extend at a distance from one another, said attachment part comprising:

elastically deformable clamping devices which are arranged to be brought into contact with the balance spring in order to exert a resilient clamping force on said balance spring so as to guarantee immobilisation thereof, said resilient clamping force being exerted along at least a first line of contact (A; B) on the first face of the balance spring and along a contact surface (S) on the second face, the first face and the second face being parallel to the plane of the coils, wherein the clamping device takes the form of separate first and second clamping devices which face one another, and wherein the first and second clamping devices take the form of two elastically deformable arms, the two arms being arranged such that free ends of the two arms face one another and are both brought into contact with the first face of the balance spring, the first face of the balance spring being located on a free end of an outermost coil of the coils of the balance spring in order to exert a resilient clamping force (F1) on said free end in a direction (Z) perpendicular to a plane (X, Y) wherein the balance spring extends.

2. The attachment part according to claim 1, wherein the resilient clamping force is exerted on the first face of the balance spring along the first and second lines of contact (A, B).

3. The attachment part according to claim 1, wherein the attachment part takes the form of a tuning fork including a crosspiece with the two arms extending from the crosspiece and being bent such that the free ends of the two arms face a center of the crosspiece.

4. The attachment part according to claim 1, wherein the attachment part is provided with gripping devices which are arranged to allow the devices for clamping a free end of the outer last outermost coil of the balance spring to be moved apart in order to release said free end.

5. The attachment part according to claim 1, wherein the attachment part comprises a device for being mounted on a balance cock or around a pivot bearing of the balance.

6. The attachment part according to claim 1, wherein a free end of the outermost coil of the balance spring is removable from the attachment part.

7. The attachment part according to claim 1, wherein the attachment part is obtained by stamping and bending.

8. The attachment part according to claim 1, wherein the attachment part is made of a harder material than the material from which the balance spring is made.

9. The attachment part according to claim 1, wherein the balance spring takes the form of a ribbon, the first and second faces whereof extend parallel to one another.

10. The attachment part according to claim 1, wherein the balance spring is provided with a plate on which the clamping device exert the resilient clamping force to ensure the immobilisation thereof.

11. The attachment part according to claim 1, wherein the balance spring includes side faces that extend from the first face to the second face and, in a cross section of the balance spring, each of the side faces is longer than the first face and the second face.

* * * * *